Sept. 2, 1941.　　　W. J. BRETH　　　2,254,588
CHUCK
Filed Jan. 31, 1939
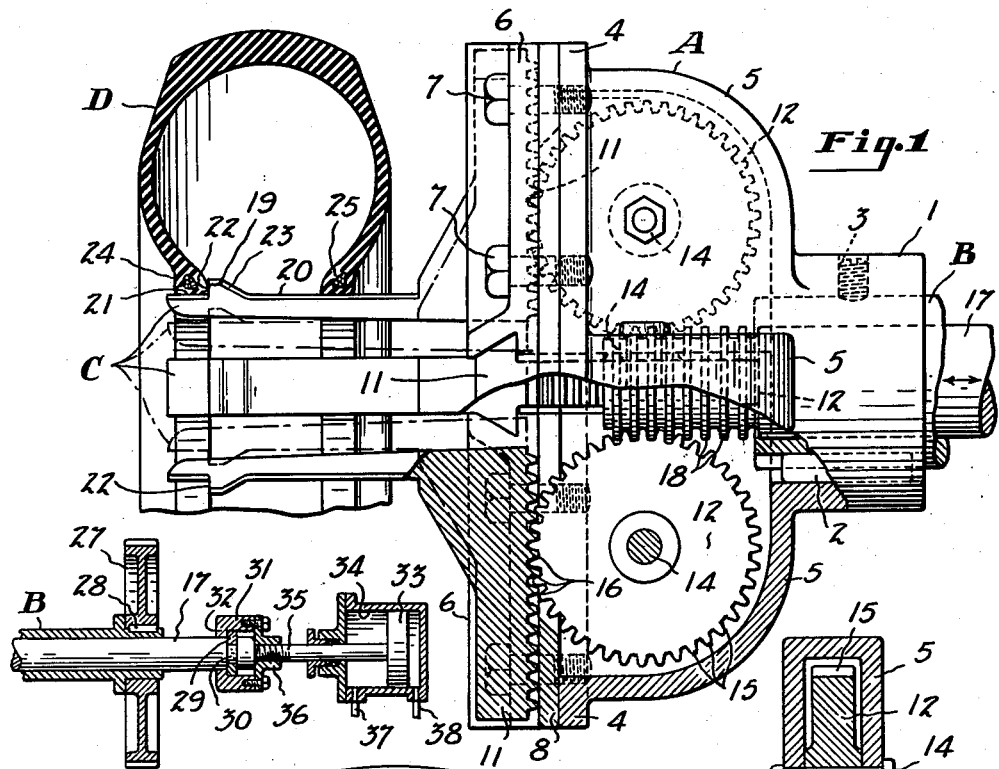
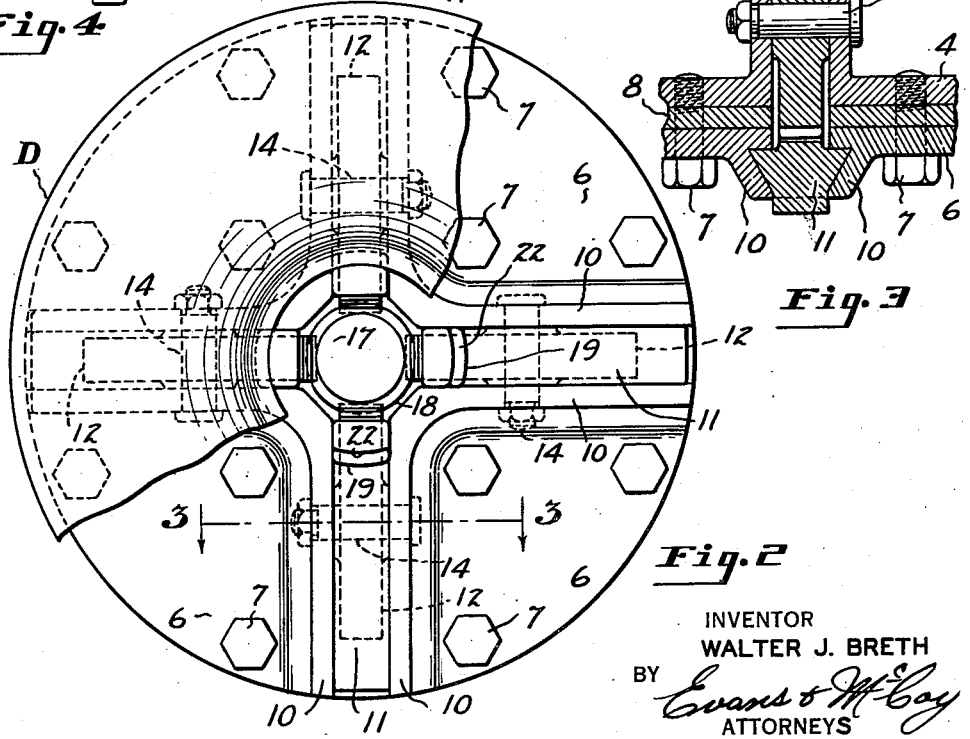
INVENTOR
WALTER J. BRETH
BY
ATTORNEYS Patented Sept. 2, 1941

2,254,588

UNITED STATES PATENT OFFICE 2,254,588

CHUCK

Walter J. Breth, Akron, Ohio, assignor to The General Tire & Rubber Company, Akron, Ohio, a corporation of Ohio Application January 31, 1939, Serial No. 253,797

5 Claims. (Cl. 154—9)

This invention relates to rotatable chucks and more particularly to a quick acting chuck for mounting and rotating an annulus such as a pneumatic tire casing.

In the rubber tire industry it is often necessary or desirable to mount a tire for rotation so as to facilitate the performing of an operation or operations thereon. In some instances the annulus or tire is merely to be supported in a rotatable position so that an operator can rotate the same by hand if desired, so as to bring various portions of the tire into convenient position, while in other instances it is desirable that an annulus or tire be rotated at a relatively high velocity while performing an operation on the entire circumference thereof. Regardless of the purpose for which the annulus or tire is to be supported, it is desirable that the mounting and demounting thereof be accomplished as rapidly as possible so as to reduce the time required for the particular manufacturing process being carried out. It is, therefore, an object of the invention to provide a device for mounting an annulus or tire which may be quickly and easily operated for the mounting and demounting of a tire thereon.

Another object is to provide a chuck for mounting an annulus or tire which may be actuated to grip or release the annulus while the same is being rotated.

Another object is to provide an improved chuck for mounting an annulus which, while being quick and positive in action, is simple in design and construction and relatively inexpensive to manufacture. Other objects and advantages will become apparent from the following detailed description of a suitable embodiment of the invention made in connection with the accompanying drawing, in which:

Figure 1 is an elevational view partly in section and with parts removed showing my improved chuck with a tire casing mounted thereon;

Fig. 2 is an end elevational view of the chuck;

Fig. 3 is a sectional detail taken substantially on the line 3—3 of Fig. 2; and

Fig. 4 is a diagrammatic view, in section, illustrating means for actuating the tire chuck.

Referring to the drawing by numerals of reference which indicate like parts throughout the several views, the chuck illustrated comprises a rotatable member or body A mounted on a rotatable hollow driveshaft B and provided with movable elements C which engage an annulus or tire D to be mounted on the device.

The body A has a cylindrical portion or hub 1 which is received on an end of the hollow shaft B and is secured against rotation by a key 2 and set screw 3. A circular, radially extending flange 4 is formed at one end of the hub 1 and in the angle between the hub and flange are formed a plurality of gear housings 5. The hub 1, flange 4, and gear housings 5 are formed of suitable, strong, rigid material such as iron or steel and may preferably be cast as an integral unit. In the embodiment of the invention illustrated there are four gear housings which are spaced equal angular distances around the axis of rotation of the body A so as to be separated from one another about 90 degrees.

A plurality of guide members 6, equal in number to the gear housings 5, are secured to the opposite side of the flange 4 from the housings 5 by means of bolts 7. If desired, a spacing plate 8 may be interposed between the flange 4 and guide members 6. Each of the guide members is substantially sector-shaped, and along adjacent sides is formed with tracks 10 which are disposed substantially radially with respect to the axis of rotation of the chuck. The tracks 10 of adjacent guide members are parallel to one another and cooperatively define dovetail recesses which accommodate rack members 1 movable toward and away from the axis of the chuck in the dovetail guide recesses.

In each of the housings 5 is disposed a gear 12 journalled on a pintle 14 secured in the side walls of the housing. Each of the gears 12 is rotatable in a plane which includes both the axis of rotation of the chuck and the line of reciprocation of the corresponding rack bar 11, the latter preferably being substantially radial with respect to the rotational axis of the chuck, as shown. Teeth 15 on the gears 12 mesh with teeth 16 formed on the rack bars 11 so that rotation of the gears actuates the rack bars for radial movement.

Extending axially through the hollow shaft B is a control rod or member 17 having circular rack teeth 18 formed on the end thereof disposed within the chuck body A. These teeth simultaneously engage the teeth 15 of all of the gears 12 so that the latter are simultaneously rotated by movement of the rod 17 axially in the shaft B. In this manner simultaneous movement may be imparted to all of the rack bars 11 to move the rack bars toward the center of the chuck or radially apart away from the center of the chuck.

The holding elements C are parallel to one another and extend in parallel relation with respect to the rotational axis of the chuck. They are secured to the several rack bars 11 preferably at the inner ends of the latter. Accordingly, upon contraction of the rack bars the holding elements C may be drawn closely together so as to accommodate an annulus of relatively small diameter, in this case much smaller than the outside diameter of the chuck. Each of the holding elements C is provided with a radial protuberance 19 which thus separates the element into an inner supporting surface 20 and an outer supporting surface 21, the latter being limited by a shoulder 22 on the protuberance 19. A sloping surface 23 on the protuberance 19 is formed on the side thereof which is adjacent the supporting surface 20 so as to facilitate the removal of a tire casing from the holding elements C.

Thus the present invention provides a chuck which can accommodate tire casings or the like of variable diameter and which have beads 24 and 25 spaced at various distances apart. In each instance the outer bead 24 may be seated on the relatively narrow supporting surfaces 21 of the holding element C in abutting engagement with the shoulders 22 of the protuberances or projections 19 while the inner bead 25 rests on the relatively wide supporting surfaces 20 of the elements C. In this manner the tire casing D is automatically aligned on the chuck by engagement of the outer bead thereof with the shoulders 22 formed on the holding elements so as to rotate in a true circle. Additionally, the unique arrangement of the protuberances 19 holding the outer bead of the tire casing relatively close to the outer ends of the holding elements prevents the latter from projecting beyond the plane of the outside surface of the tire casing so that danger to the operator, through being struck by or entangled with the supporting or holding elements, is minimized.

In order to secure a tire casing or other annulus on the chuck the holding element C of the latter are contracted together and the annulus placed with the inner and outer beads 24 and 25 thereof disposed respectively on the supporting surfaces 20 and 21 of the uppermost holding element. Control member 17 is then actuated to slide within the hollow shaft B to the left as viewed in Fig. 1, so as to rotate the gears 12 and move the rack bars 11 radially outward, thus increasing the effective diameter of the holding element C so that the latter engage the beads of the tire D at uniformly spaced areas or regions about the inner periphery thereof. When it is desired to release the tire or annulus D the control member or rod 17 is moved to the right as viewed in Fig. 1, so as to actuate the gears 12 to draw the rack members 11 toward one another and contract the holding elements C so as to move inwardly away from the beads 24 and 25 of the annulus. While in the embodiment illustrated the holding elements engage the inner periphery of the annulus to hold or lock the annulus in place, they may be arranged to engage the outer periphery, as is well known, so as to clamp the annulus by contracting thereon.

It is to be observed that the actuation of the control rod 17 may be effected while the body member A of the chuck is stationary or while it is being rotated by the hollow shaft B. In this manner the speed at which a succession of tires or other similar annuli can be mounted upon and removed from the chuck after the performing of an operation or process thereon, may be materially increased over that which would obtain if it were necessary to stop the chuck before the tire could be released. If desired, and especially where the chuck is to operate at a relatively slow rate of speed, successive tires may be mounted and demounted therefrom without arresting the rotation of the chuck, merely by suitable actuation of the rod or control member 17.

In Fig. 4 is diagrammatically illustrated a mechanism for actuating the control rod. The rotatable hollow shaft B is mounted in a suitable journal (not shown) and actuated by a gear 27 driven in any suitable manner, the gear being secured to the shaft B by a key 28. A split collar 29 is carried in an annular groove 30 formed in the projecting end of the circular control rod 17 and is embraced by a coupling collar 31, the latter having an inwardly directed flange 32 which engages one side of the ring 29. A piston 33 slidable in a cylinder 34 is connected to the coupling 31 by means of a rod 35 and flanged cap 36, the latter being secured to the coupling 31. In this manner, while the control rod or member 17 is free to rotate with respect to the piston rod 35, the latter is arranged to actuate the control rod for axial movement in the hollow shaft B. Suitable conduits 37 and 38 and valves (not shown) are provided for the cylinder 34 so that a fluid such as air under pressure from a suitable source of supply may be introduced into one or the other of the ends of the cylinder on opposite sides of the piston 33 to move the latter in the cylinder as desired, it being understood that the cylinder is rigidly supported so as to actuate the rod 35 and control member 17.

While in the embodiment of the invention illustrated the control member 17 is shown as being round with circular rack teeth 18 formed thereon, it is to be understood that any other suitable shape may be employed. For example, while in the present invention the control member 17 may be stationary while the hollow shaft B rotated thereabout, the control member may be arranged so as to rotate with the hollow shaft and a rotatable coupling such as that shown in Fig. 4 employed to permit actuation of the control member while the chuck is being rotated.

Other modes of utilizing the principles of the present invention may be resorted to, change being made in the details of construction as desired, it being understood that the embodiment of the invention described above and shown in the drawing is given for purposes of illustration and explanation, numerous alterations and substitutions of parts being contemplated.

What I claim is:

1. A chuck structure comprising a substantially flat disclike rotatable body member having a hub and a radially extending circular flange, a plurality of sector shaped guide members removably secured flat-wise to the body member with the edges of adjacent guide members disposed in substantially parallel spaced relation to one another, holding elements slidably received between the guide members and interfitted with said edges, rack teeth on the holding elements, a plurality of individual gear housings formed on the body member in the angle between the hub and flange and extending axially from the flange and radially from the hub of the body member, and gears journaled in the housings and meshed with the rack teeth for moving the elements along the guide members and for retaining the elements in fixed positions.

2. A chuck for rotatably supporting tires comprising a rotatable body member, guides on the body member, holding elements slidable on the guides and formed with support portions extending in substantially parallel relation to the rotational axis of the body member and elongated in the direction of said axis, and radial protuberances on the outer surfaces of the support portions intermediate the ends thereof and having shoulders to engage a tire mounted on the chuck to limit axial movement thereof.

3. A chuck for rotatably supporting tires comprising a rotatable body member, guides on the body member, holding elements having rack portions slidable on the guides and radially disposed relative to the axis of rotation of the body member and support portions extending substantially parallel to and elongated in the direction of said axis, gears carried by the body member and meshed with said rack portions for actuating the holding elements, and protuberances on the outer surfaces of the support portions intermediate the ends thereof and having radial shoulders to engage a tire mounted on the chuck.

4. A chuck for rotatably supporting tires comprising a rotatable body member, guides on the body member, holding elements slidable on the guides and formed with support portions extending in substantially parallel relation to the rotational axis of the body member and elongated in the direction of said axis, and protuberances on the radially outwardly directed surfaces of the support portions intermediate the ends thereof, said protuberances each having a radial shoulder on one side thereof to engage a tire bead and thereby resist lateral shifting of the tire on the support portions, and sloping shoulders on the other side of each protuberance to permit lateral sliding of tire beads thereover.

5. A tire chuck comprising a gear housing and means for rotatably mounting the same, gears supported in the housing for rotation in planes which intersect approximately on the rotational axis of the housing, means movable in the direction of said axis and engageable with the gears to simultaneously actuate the same, a plurality of sector shaped guide members disposed in radial relation about the rotational axis of the gear housing, said member being secured to the housing with their edges in spaced approximately parallel relation to provide a plurality of guideways radiating from said axis, a plurality of holding elements disposed between the adjacent edges of the guide members and having interfitting relation therewith for sliding movement toward and away from the rotational axis of the gear housing, said elements having rack teeth meshing with the gears to provide for simultaneous movement of the holding elements toward and away from said axis upon rotation of the gears, each of said holding elements having a support portion of elongated character which extends in approximately parallel relation to said axis and is adapted to be moved radially to and from said axis so that all of said support portions concurrently engage the inside surfaces of the spaced beads of a tire casing supported on the chuck, and outwardly directed radial protuberances on the support portions of the holding elements intermediate the ends of said support portions, said protuberances each being closer to one end of the support portion than the other end thereof so that each protuberance is engageable with the inside of one of the beads of a tire carried by the chuck to prevent axial shifting thereof.

WALTER J. BRETH.